United States Patent
Ninane

(10) Patent No.: US 6,267,789 B1
(45) Date of Patent: Jul. 31, 2001

(54) METHOD FOR ENRICHING RAW SALT

(75) Inventor: Léon Ninane, Dombasle-sur-Meurthe (FR)

(73) Assignee: Solvay (Société Anonyme), Brussels (BE)

( * ) Notice: Subject to any disclaimer, the term of this patent is extended or adjusted under 35 U.S.C. 154(b) by 0 days.

(21) Appl. No.: 09/402,782

(22) PCT Filed: Apr. 2, 1998

(86) PCT No.: PCT/EP98/02132

§ 371 Date: Oct. 12, 1999

§ 102(e) Date: Oct. 12, 1999

(87) PCT Pub. No.: WO98/46527

PCT Pub. Date: Oct. 22, 1998

(30) Foreign Application Priority Data

Apr. 11, 1997 (FR) .................................................. 97 04587

(51) Int. Cl.$^7$ ................................ B01D 9/02; C01D 3/04; C01D 3/16
(52) U.S. Cl. ................................ 23/303; 23/298; 23/301; 423/164; 423/166; 423/499.4
(58) Field of Search .......................... 23/297, 298, 302 T, 23/303, 301; 423/184, 208, 499.4, 499.5, 164, 166

(56) References Cited

U.S. PATENT DOCUMENTS

| 3,655,333 | 4/1972 | Stenger et al. |
| 4,094,956 | 6/1978 | Bieler ................................. 423/179 |
| 4,997,637 | 3/1991 | Tufts ................................... 423/499 |
| 5,300,123 | * 4/1994 | Grott ................................... 23/303 |

FOREIGN PATENT DOCUMENTS

WO 89/03364  4/1989  (WO).

OTHER PUBLICATIONS

Perez Aguado, Agustin, Treatment of Sodium Chloride, Chemical Abstracts, vol. 80, No. 10, Mar. 11, 1974—Abstract No. 49909.
Balarev, Kh. Kh., Preparation of Pure Sodium Chloride, Chemical Abstracts, vol. 84, No. 4, Jan. 26, 1976—Abstract No. 19843.
Allen, Terence, Particle Size Measurement, Chapman and Hall, London, 1975, 2$^{nd}$ ed., pp. 250–263.
Givaudon, J. et al., Précis De Génie Chimique, Tome I, Berger–Levrault, Nancy, 1960, pp. 353–370.
Pamphlet Br 1566a–B1–0396 (Solvay), Neutrec, Flue gas cleaning with dry sodium bicarbonate and recycling of residual sodium chemicals for clean incineration—Performance and guarantees. Undated.

* cited by examiner

Primary Examiner—Wayne Langel
Assistant Examiner—Maribel Medina
(74) Attorney, Agent, or Firm—Venable; Marina V. Schneller

(57) ABSTRACT

Process for enriching crude salt, in which the crude salt is ground and then cooled in a saturated aqueous sodium chloride solution, to a temperature below the anhydrous sodium chloride to sodium chloride dihydrate transition temperature, a stock of a powder comprising sodium chloride crystals is collected from the cooling step and the powder is subjected to particle-size fractionation from which a fine particle-size fraction and a coarse particle-size fraction comprising the enriched salt are collected.

9 Claims, 4 Drawing Sheets

METHOD FOR ENRICHING RAW SALT

The invention relates to a process for enriching crude salt.

It relates in particular to a process for obtaining, starting from crude salt, salt enriched with sodium chloride, of purity sufficient to allow its use in an industrial process or as food.

Industrial salt and food salt are usually obtained starting from mineral salt which is found in the natural solid state in the earth's crust (rock salt) or which is obtained by the evaporation of natural brackish water, such as sea water or water from salt lakes. Crude mineral salt usually contains more than 80% (generally more than 90%) by weight of sodium chloride. In crude mineral salt, the sodium chloride is accompanied by impurities, especially calcium, magnesium and potassium salts (usually sulphates and/or chlorides) and iron oxides. These impurities make crude mineral salt unsuitable, as it is, for most industrial applications or as food.

U.S. Pat. No. 3,655,333 provides a process making it possible to obtain high-purity sodium chloride starting from crude salt, in which the crude salt is dispersed in a saturated solution of sodium chloride, the aqueous suspension thus obtained is cooled, below 0° C., in order to crystallize the sodium chloride dihydrate, the crystals of sodium chloride dihydrate are collected and washed with a pure aqueous solution of sodium chloride. In this known process, the washing of the crystals of sodium chloride dihydrate is a difficult, operation, the effectiveness of which is not guaranteed. It involves the use of a pure aqueous solution of sodium chloride which is then thrown away, thereby constituting a loss and increasing the cost of the sodium chloride produced.

The invention aims to remedy these drawbacks of the known process described above, by providing a novel process making it possible to obtain, starting from crude salt, high-purity sodium chloride without requiring a crystal-washing step.

The invention consequently relates to a process for enriching crude salt, in which the crude salt is cooled in a saturated aqueous sodium chloride solution to a temperature below the anhydrous sodium chloride to sodium chloride dihydrate transition temperature and, after cooling, a stock of a powder comprising sodium chloride crystals is collected, the process being characterized in that the crude salt is ground before it is cooled and the powder is subjected to particle-size fractionation from which a fine particle-size fraction and a coarse particle-size fraction comprising the enriched salt are collected.

The crude salt involved in the process according to the invention is a solid substance consisting of sodium chloride and of impurities, existing in the natural state (salt of mineral origin) or forming a residue of an industrial process. Rock salt, sea salt obtained by solar evaporation of sea water, and salt coming from the evaporation of brine obtained by dissolving rock salt in situ in a deposit constitute examples of crude salt of mineral origin. Another example of crude salt coming within the scope of the invention is that produced as a residue in processes for scrubbing hydrogen-chloride-containing fumes by means of sodium bicarbonate [SOLVAY (Société Anonyme), brochure Br 1566a-B-1-0396]. The sodium chloride weight content of crude salt is generally greater than 80%, usually at least 90% (and frequently at least 95%).

In the process according to the invention, the crude salt is ground at a temperature above the anhydrous sodium chloride to sodium chloride dihydrate transition temperature so that the sodium chloride present in the salt collected from grinding is in the form of anhydrous sodium chloride crystals. The grinding is generally carried out at ambient temperature. The crude salt collected from grinding is cooled to below the anhydrous sodium chloride to sodium chloride dihydrate transition temperature. The purpose of cooling the salt is to recrystallize the sodium chloride into the form of sodium chloride dihydrate. The salt is cooled in a saturated aqueous sodium chloride solution. For this purpose, various operating methods may be employed. According to a first operating method, the aqueous sodium chloride solution is used at ambient temperature, the crude salt is introduced into it at ambient temperature and the resulting aqueous suspension is cooled to below the aforementioned transition temperature.

According to another operating method, the crude salt being at ambient temperature, the saturated aqueous sodium chloride solution is firstly cooled to a temperature below the said transition temperature and then the crude salt is introduced into the cold solution. The cooling temperature of the ground crude salt is chosen so that the anhydrous sodium chloride recrystallizes to sodium chloride dihydrate in the saturated aqueous sodium chloride solution in a time which is technically and economically acceptable. In practice, the ground crude salt is cooled to a temperature which is more than 2° C. (preferably at least 5° C.) below the aforementioned transition temperature. Consequently, the crude salt is generally cooled in the saturated sodium chloride solution to a temperature below −2° C., at standard atmospheric pressure, the temperatures lying between −5 and −15° C. being especially recommended.

After cooling, an aqueous stock of a powder comprising sodium chloride dihydrate crystals is collected. According to the invention, the said powder is subjected to particle-size fractionation. As a variant, before the powder is subjected to particle-size fractionation, the stock is heated to a temperature above the aforementioned transition temperature in order to recrystallize the sodium chloride to the anhydrous state. In this alternative method of implementation of the process according to the invention, the temperature to which the stock is heated is chosen so that the sodium chloride dihydrate recrystallizes to anhydrous sodium chloride in a time which is technically and economically acceptable. In practice, the stock is heated to a temperature which is more than 2° C. (preferably at least 5° C.) above the aforementioned transition temperature. Consequently, the stock is generally heated to a temperature above 2° C., at standard atmospheric pressure, the temperatures lying between 5 and 15° C. being especially recommended.

In the present specification, the expression "powder comprising sodium chloride crystals" denotes, equally well, either a powder comprising anhydrous sodium chloride crystals or a powder comprising sodium chloride dihydrate crystals, depending on whether or not the aforementioned variant of the process is carried out.

According to the invention, it is preferred to carry out the said alternative method of implementation so that the powder subjected to particle-size fractionation is a powder of anhydrous sodium chloride crystals.

In the process according to the invention, the conditions employed in grinding, on the one hand, and in cooling, on the other hand, are set so that the particles of ground crude salt have a smaller mean diameter than the mean diameter of the sodium chloride crystals in the powder of the stock collected from cooling.

The mean diameter of the crude salt particles (namely, sodium chloride crystals) is defined by the mathematical equation $$d = \frac{\sum n_i d_i}{\sum n_i}$$

in which d denotes the mean diameter and $n_i$ denotes the frequency by weight of the crude salt particles (namely, sodium chloride crystals) of diameter $d_i$, the diameters $d_i$ being measured by screening according to the AFNOR standard.

In the process according to the invention, the purpose of the particle-size fractionation is to split the particles of the stock powder into two separate particle-size fractions (a coarse particle-size fraction containing enriched salt and a fine particle-size fraction containing most of the crude-salt impurities). The particle-size fractionation is set so that the cut-off diameter of the two particle-size fractions is approximately equal to the mean diameter of the sodium chloride crystals of the stock powder, the cut-off diameter being, by definition, the diameter of the holes in the standardized screen for particle-size measurement (according to the AFNOR standard) through which the entire fine particle-size fraction passes, the entire coarse particle-size fraction being stopped by the screen. In order to improve the degree of purity of the enriched salt, a cut-off diameter greater than the mean diameter of the sodium chloride crystals of the stock powder may be selected. All other things being equal, the greater the aforementioned cut-off diameter the higher is the level of purity of the enriched salt (and the higher is its sodium chloride content). On the other hand, the greater the difference between these two diameters the greater is the sodium chloride loss in the fine particle-size fraction. On the contrary, it may also be possible to select a cut-off diameter slightly smaller than the mean diameter of the sodium chloride crystals if it is desired to reduce the sodium chloride loss, this reduction being, however, to the detriment of the purity of the enriched salt. The optimum cut-off diameter must consequently be determined in each particular case according to a compromise between the degree of purity desired for the salt and the acceptable sodium chloride loss. In general, good results are obtained when the crude-salt particles collected from grinding have a mean diameter of less than 200 $\mu$m, preferably less than 150 $\mu$m. Although in theory there is no lower limit to the mean diameter of the particles of ground crude salt, there is no advantage in practice in grinding too finely, for economic considerations, and so as not to handicap the rest of the process. In practice, it is consequently advantageous for the crude salt collected from grinding to have a mean diameter greater than 25 $\mu$m, preferably greater than 50 $\mu$m. Mean diameters from 100 to 150 $\mu$m are recommended. Good results are obtained when the mean diameter of the crude salt collected from grinding lies approximately between 100 and 150 $\mu$m, the cut-off diameter being between 80 and 150 $\mu$m, preferably at least equal to 100 $\mu$m.

The particle-size fractionation of the stock powder may be carried out by any suitable known means. According to a first method of implementation, the aqueous stock is filtered or decanted in order to extract the powder therefrom, this powder being subsequently dried and screened. In another method of implementation, which is preferred, the particle-size fractionation of the powder is carried out by elutriation of the aqueous stock. Elutriation is a well-known particle-size analysis technique (Particle Size Measurement, Terence Allen, Chapman and Hall, London, 1974, pages 250–263).

In an advantageous method of implementing the process according to the invention, the grinding of the crude salt is followed by particle-size separation, by which the ground salt is split into a fine particle-size fraction, which is collected and cooled in the aqueous sodium chloride solution, and a coarse particle-size fraction which is discarded or recycled for grinding. In this method of implementing the process according to the invention, it is desirable that the cut-off diameter for particle-size fractionation of the powder comprising the recrystallized sodium chloride be not more than 20% (preferably not more than 10%) less than the cut-off diameter for particle-size separation of the ground crude salt. Preferably, the cut-off diameter for particle-size fractionation of the powder comprising recrystallized sodium chloride is at least equal to the cut-off diameter for particle-size separation of the ground crude salt. In general, it is recommended to select a cut-off diameter of less than 200 $\mu$m for particle-size separation of the ground salt. Good results are obtained when the cut-off diameter for particle-size separation of the ground salt is at most equal to 100 $\mu$m, the cut-off diameter for particle-size fractionation of the powder being greater than 80 $\mu$m, preferably at least equal to 100 $\mu$m.

In another advantageous method of implementing the process according to the invention, the mother liquor collected from the stock after separating the powder is used to reconstitute the saturated aqueous sodium chloride solution used for cooling the ground crude salt. In this method of implementing the process according to the invention, it is desirable to purify the mother liquor in order to remove therefrom at least a fraction of the dissolved impurities. In practice, the fraction to be removed is approximately equal to the molar quantity of the impurities present in the crude salt employed. In the particular case of a crude salt of mineral origin (for example, rock salt), the mother liquor is normally contaminated with calcium, magnesium and sulphate ions, coming from the main impurities of the crude salt (calcium sulphate and polyhalite) In this particular case, purification of the mother liquor usually comprises adding sodium or calcium hydroxide to crystallize and precipitate the magnesium as magnesium hydroxide and adding calcium chloride to crystallize and precipitate the sulphate ions as gypsum. The respective quantities of sodium or calcium hydroxide and of calcium chloride are approximately equal to the quantities necessary for precipitating the calcium, magnesium and sulphate ions of the crude salt employed.

As explained above, it is preferred, according to the invention, to recrystallize the sodium chloride dihydrate as anhydrous sodium chloride, before subjecting the stock powder to particle-size fractionation. In a particular variant of this preferred method of implementing the process according to the invention, the sodium chloride dihydrate is recrystallized as anhydrous sodium chloride in a crystallizer in which particle-size classification into two particle-size classes and removal of the finer of these two classes are carried out simultaneously. In this particular method of implementing the process according to the invention, the cut-off diameter of the two particle-size classes is approximately equal to the mean diameter of the recrystallized anhydrous sodium chloride crystals.

In the particular method of implementation just described, the recrystallization and simultaneous particle-size classification are advantageously carried out in a fluidized bed of sodium chloride crystals at a temperature below the aforementioned transition temperature (in the case of sodium chloride dihydrate crystallization) or at a temperature above the said transition temperature (in the case of anhydrous sodium chloride crystallization). On passing through the fluidized bed, the sodium chloride in the stock recrystallizes as sodium chloride dihydrate or as anhydrous sodium chloride, depending on the temperature of the bed. The fluidization of the bed is set so that the stock powder splits up therein into two particle-size fractions, one of which (the coarse fraction) is collected at the bottom of the bed and the other of which (the fine particle-size fraction) is driven to the top, out of the bed. In this method of implementing the process according to the invention, the crystals of the bed are fluidized by the stock blowing upwards through the bed. As a variant, in order to make it easier to fluidize the bed, it is advantageous to dilute the stock in a saturated aqueous sodium chloride solution. In this variant of the invention, the aqueous solution used for diluting the stock is advantageously an aqueous solution which is separated from the fine particle-size fraction collected at the top of the bed.

Special features and details of the invention will appear in the course of the following description of the appended drawings, which are diagrams of plants for carrying out a few methods of implementing the process according to the invention.

In these figures, the same reference notations denote identical elements.

Figure 1:
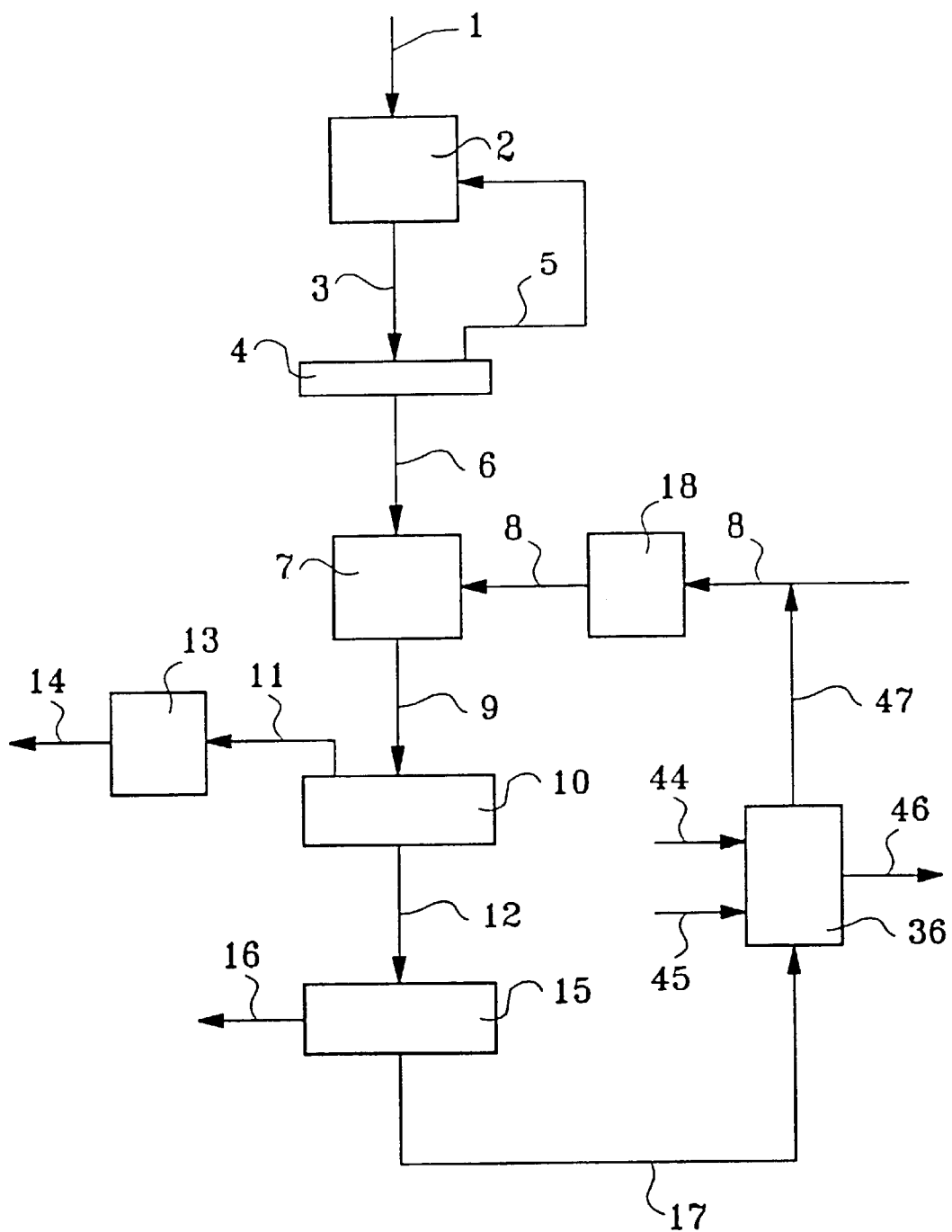
FIG. 1 is a diagram of a plant for carrying out a first method of implementing the process according to the invention.

In the plant illustrated in FIG. 1, crude salt 1 (for example, rock salt) is introduced into a grinder 2, from which ground crude salt 3 is moved. The ground crude salt 3 is sent to a screen 4 where it is separated into two particle-size fractions 5 and 6. The screen 4 is chosen so that the cut-off diameter of the two particle-size fractions is approximately equal to 100 $\mu$m. The coarse particle-size fraction 5 is recycled back into the grinder 2 and the fine particle-size fraction 6 is sent to a crystallization chamber 7. The crystallization chamber 7 is moreover fed with a saturated aqueous sodium chloride solution 8 coming from a cooler 18, where it has been cooled to a temperature below the anhydrous sodium chloride to sodium chloride dihydrate transition temperature (for example, to a temperature lying between −5 and −10° C.). In the crystallization chamber 7, the solid salt 6 is dispersed in the cold solution 8, this having the result of recrystallizing the anhydrous sodium chloride as sodium chloride dihydrate. An aqueous stock 9 of a powder containing sodium chloride dihydrate crystals is removed from the crystallization chamber 7. The stock 9 is sent to a calibrated screen 10, where the powder is separated into two particle-size fractions 11 and 12, having a cut-off diameter of approximately 100 $\mu$m. The coarse particle-size fraction 11, retained on the screen, comprises salt enriched with sodium chloride (as the dihydrate). This coarse fraction is sent to a heater 13 where it is heated to ambient temperature, this having the effect of recrystallizing the sodium chloride dihydrate as anhydrous sodium chloride. The enriched salt 14 collected from the heater 13 is transferred to a drying plant, not illustrated.

The stock 12 collected from under the calibrated screen 10 contains the fine particle-size fraction of the powder, essentially consisting of the impurities of the salt. It is sent to a filter 15 in order to separate therefrom a solid fraction 16 and a mother liquor 17.

The mother liquor 17 is contaminated by dissolved impurities, especially sodium sulphate and magnesium sulphate coming from the polyhalite of the rock salt, and is sent to a purification chamber 36 where sodium hydroxide 44 and calcium chloride 45 are added. Collected from the purification chamber 36 are, on the one hand, a precipitate 46 of magnesium hydroxide and calcium sulphate dihydrate, which is removed, and, on the other hand, an aqueous sodium chloride solution 47 which is sent into the aqueous solution 8, upstream of the cooler 18.

Figure 2:
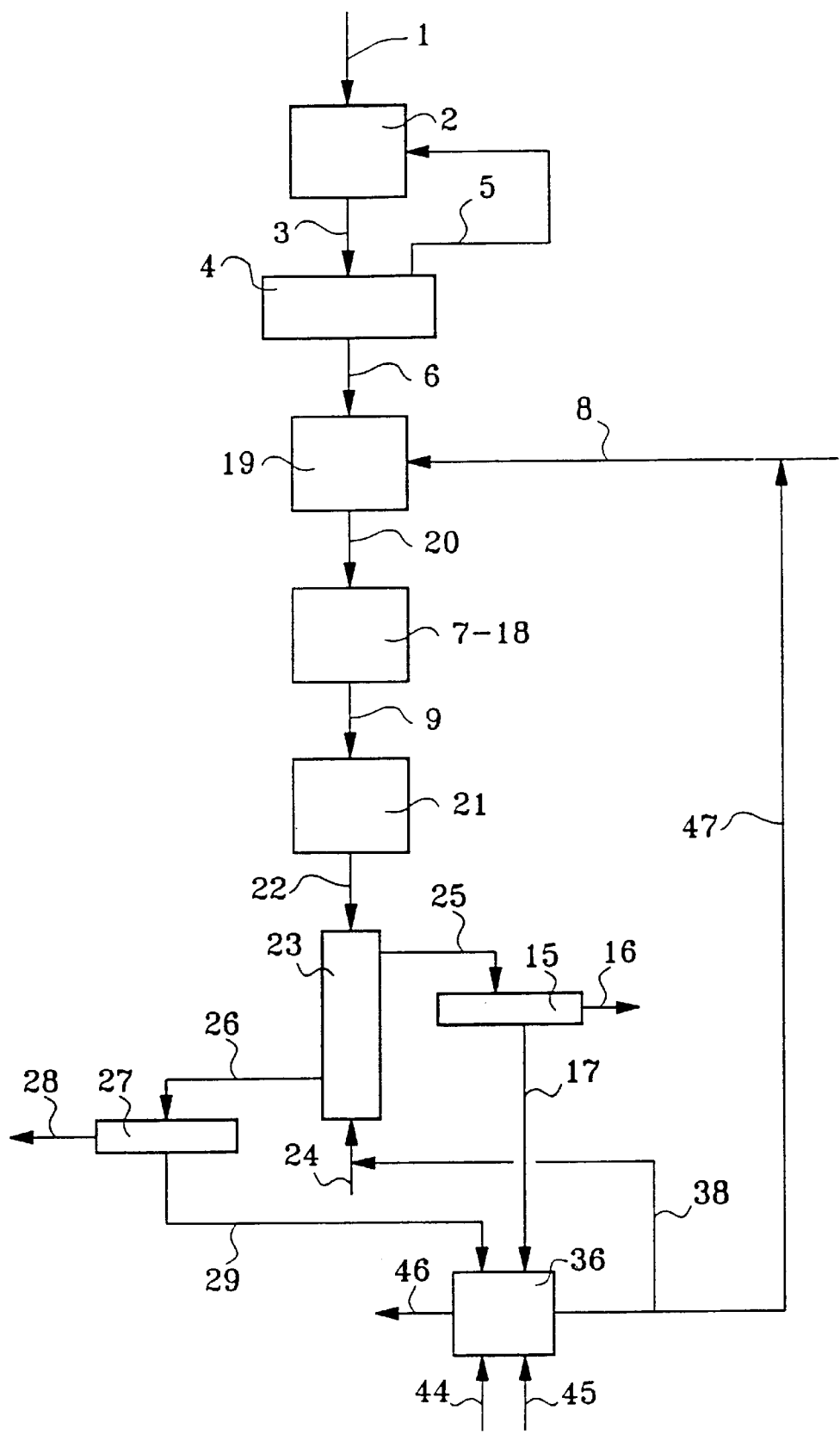
FIG. 2 is a diagram of a plant for carrying out a second method of implementing the process according to the invention.

In the plant shown in FIG. 2, the cooler 18 is incorporated into the crystallization chamber 7. The plant furthermore includes a mixing chamber 19 upstream of the crystallization chamber 7. The mixing chamber 19 is fed with the fine fraction 6 of crude salt and with the saturated aqueous sodium chloride solution 8, at ambient temperature. Collected from the mixing chamber 19 is an approximately homogeneous suspension 20, at ambient temperature, which is introduced, as such, into the cooling and crystallization chamber 7–18. In the latter, the aqueous suspension 20 is cooled to below the anhydrous sodium chloride to sodium chloride dihydrate transition temperature. Collected from the chamber 7–18 is an aqueous stock 9 of sodium chloride dihydrate crystals, which is introduced into a warming chamber 21, where it is heated to a temperature close to ambient temperature. The sodium chloride dihydrate of the stock recrystallizes in the chamber 21 as anhydrous sodium chloride and a stock 22 of anhydrous sodium chloride crystals is collected. The stock 22 is transferred to the top of an elutriation column 23, of the levigation type, where it is subjected to the action of a rising stream 24 of water or of approximately saturated aqueous sodium chloride solution. The velocity of the levigation stream 24 is set so as to fractionate the stock powder into two separate particle-size fractions, the cut-off diameter of which is approximately equal to 100 $\mu$m. A portion 25 of the stock, containing the fine particle-size fraction of the powder, is collected at the top of the column 23 and the portion 26 of the stock, containing the coarse particle-size fraction of the powder, is collected at the bottom of the column. The portion 26 is treated over a filter 27, from which are collected enriched salt 28, which is sent to a drying plant (not illustrated), and a mother liquor 29.

The portion 25 of the stock, containing the fine fraction, is treated over the filter 15 in order to separate it into a solid fraction 16 and a mother liquor 17.

The mother liquors 17 and 29 are contaminated by dissolved impurities, especially sodium sulphate and magnesium sulphate coming from the polyhalite of rock salt. They are collected in a purification chamber 36 into which sodium hydroxide 44 and calcium chloride 45 are added. Collected from the purification chamber 36 are, on the one hand, a magnesium hydroxide and calcium sulphate dihydrate precipitate 46, which is removed, and, on the other hand, an aqueous sodium chloride solution, a part 47 of which is sent into the aqueous solution 8 and another part 38 of which is sent into the levigation stream 24.

In a variant (not illustrated) of the plant shown in FIG. 2, the mother liquors 17 and 29 are sent, as they are, into the mixing chamber 19, without passing through the purification chamber 36, and the reagents 44 and 45 are introduced into the mixing chamber 19.

Figure 3:
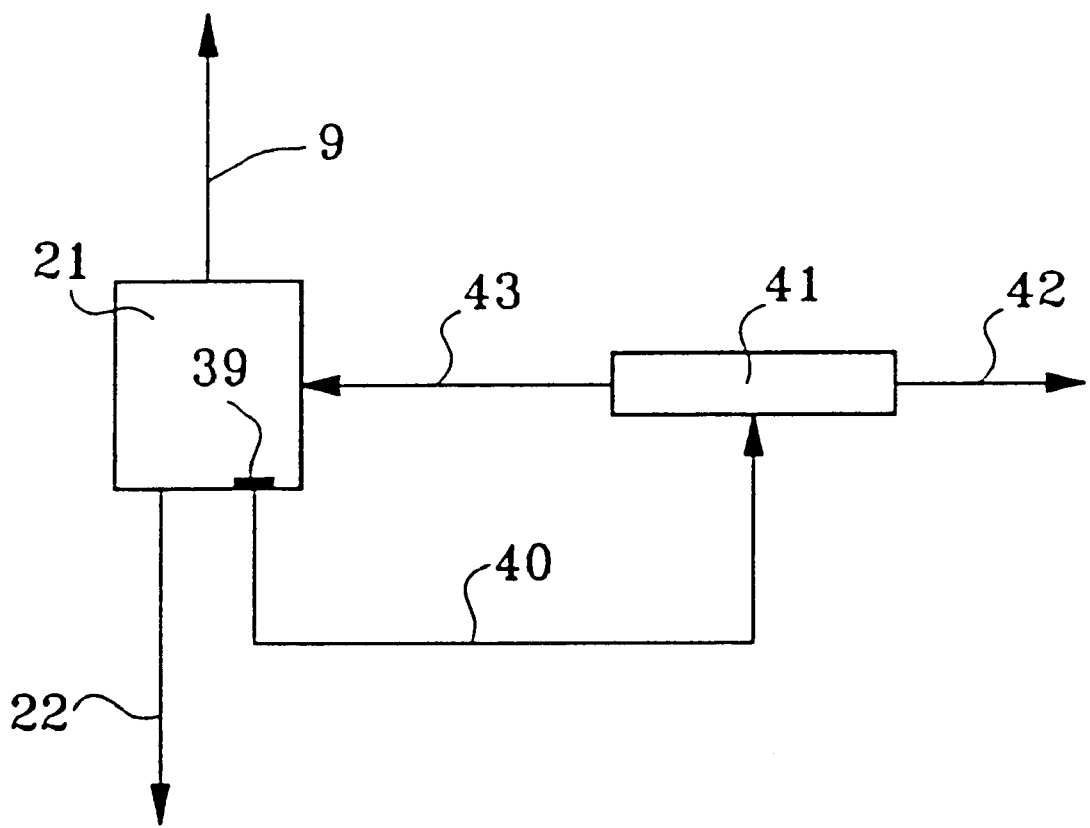
FIG. 3 shows a detail of an alternative embodiment of the plant of FIG. 2.

FIG. 3 shows a detail of a modified embodiment of the plant in FIG. 2. In this modified embodiment, the warming chamber 21 incorporates a particle-size classifier which comprises, for example, a screen depicted diagrammatically at 39. In this modified plant, a fraction 40 of the medium being crystallized is continuously removed, making it pass through the screen 39, so as to leave in the chamber 21 the anhydrous sodium chloride crystals which have recrystallized. Downstream of the screen 39, the fraction 40 is treated over a filter 41 in order to separate it from the fine solid particles 42, which are removed or recycled into the grinder 2, and an aqueous solution 43 which is recycled into the chamber 21. In the plant shown in FIG. 3, the screen 39 is chosen so that it has approximately the same cut-off diameter as that in the elutriation column 23. This plant according to the invention thus has the particular feature of reducing the quantity of very fine impurity particles in the chamber 21, which are liable to constitute parasitic-crystallization seeds for the anhydrous sodium chloride, and consequently increases the degree of purity of the enriched salt 28.

Figure 4:
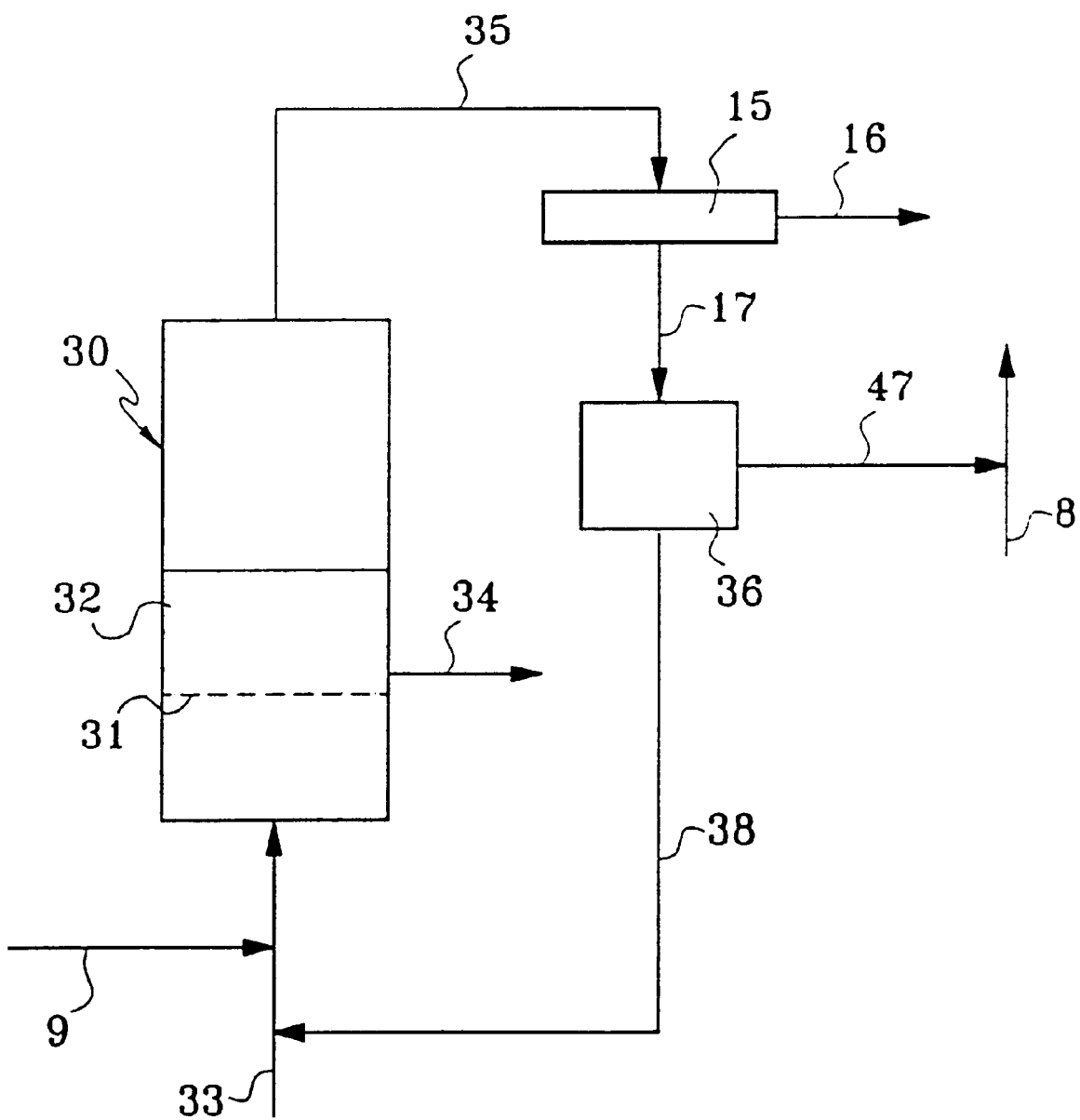
FIG. 4 shows a detail of another alternative embodiment of the plant of FIG. 2.

FIG. 4 shows a detail of another modified embodiment of the plant of FIG. 2. In this modified embodiment, the warming chamber 21 and the elutriation column 23 of FIG. 2 are replaced by apparatus which includes (FIG. 4) a crystallizer 30 of the fluidized-bed type. The crystallizer 30 contains, above a fluidization mesh 31, a bed 32 of sodium chloride crystals which is fluidized by a rising stream of a saturated aqueous sodium chloride solution 33. Crystallizers of the fluidized-bed type are well-known in the art (GIVAUDON, Massot and BENSIMONT—"Précis de génie chimique" [Chemical engineering manual], Volume 1, 1960, Berger-Levrault, Nancy—pages 353 to 370). The crystal bed 32 in the crystallizer 30 is maintained at ambient temperature. The stock 9 of sodium chloride dihydrate crystals is introduced into the fluidization stream 33 and driven with it into the bed 32. In the bed 32, the sodium chloride dihydrate of the stock recrystallizes as anhydrous sodium chloride. The velocity of the fluidization stream 33 is set so as to subject the stock to particle-size separation by levigation so that the coarse particles form a sediment in the bed and are collected at 34 from the bottom of the bed, while the fine particles are driven out of the bed and collected at the top of the crystallizer, as a dispersion 35 in the fluidization solution. The particles 34 are treated in a dryer, not illustrated, and constitute the enriched salt. The aqueous dispersion 35 is treated over the filter 15 from which are extracted a filter cake 16, which is removed, and a mother liquor 17 which is collected in the purification chamber 36 where it is subjected to magnesium and sulphate purification, as explained above. One part (47) of the purified mother liquor is recycled into the saturated solution 8 (FIG. 2) and another part (38) is sent into the fluidization stream 33.

The following examples serve to illustrate the invention.

EXAMPLE 1

The process according to the invention has been applied to the enrichment of rock salt coming from the Borth mine in Germany. The contents of the main impurities (calcium, magnesium and sulphate ions) of the crude salt extracted from the mine are given below:

| | |
|---|---|
| water | 0.122 g/kg |
| calcium (expressed as $CaSO_4$) | 12.38 g/kg (dry salt) |
| magnesium (expressed as $MgSO_4$) | 1.44 g/kg (dry salt) |
| $SO_4$ ions (expressed at $Na_2SO_4$, after removing the $MgSO_4$ and $CaSO_4$) | 2.77 g/kg (dry salt) |
| other insoluble impurities | 0.68 g/kg (dry salt) |
| sodium chloride | 982.73 g/kg (dry salt) |

The salt was ground and then treated over a screen, in order to remove therefrom, the fraction containing particle sizes greater than 100 μm. The fraction containing particle sizes less than 100 μm (the undersize) was recovered and subjected to the process according to the invention. For this purpose, part of the salt was dissolved in water so as to form a saturated aqueous sodium chloride solution. After filtering the solution, in order to remove the insoluble matter from it, another part of the salt, of weight approximately equal to ⅕ of the weight of the solution, was dispersed in the latter. The resulting aqueous stock was homogenized by stirring, at ambient temperature, and then introduced into a thermostatically controlled chamber in which it was gradually cooled down to approximately −10° C. and left there for a time sufficient for the anhydrous sodium chloride to be completely recrystallized as sodium chloride dihydrate. Next, the temperature in the chamber was gradually raised to ambient temperature in order to recrystallize the sodium chloride dihydrate as anhydrous sodium chloride. The stock was then extracted from the chamber and filtered. After drying, the filter cake was dried and then treated over a screen for fractionating it into two particle-size classes, having a cut-off diameter of 100 μm. The less-than-100 μm particle-size class was removed and the greater-than-100 μm particle-size class was collected. The latter represented 71.8% of the total weight of the cake (dry-matter weight). Its composition is given below:

| | |
|---|---|
| water | 0.165 g/kg |
| calcium (expressed as $CaSO_4$) | 1.8 g/kg (dry salt) |
| magnesium (expressed as $MgSO_4$) | 0.012 g/kg (dry salt) |
| $SO_4$ ions | 0.064 g/kg (dry salt) |
| other insoluble impurities | 0.048 g/kg (dry salt) |
| sodium chloride | 998.08 g/kg (dry salt) |

It may be seen that the process has appreciably enriched the salt, the weight content of sodium chloride of which exceeds 99.8%.

EXAMPLE 2

The test shown in Example 1 was repeated with rock salt bound to below 100 μm, having the following respective contents of calcium, magnesium and sulphate ions:

| | |
|---|---|
| calcium | 3.84 g/kg |
| magnesium | 0.32 g/kg |
| sulphate | 11.9 g/kg |

The salt was subjected to the same treatment as in Example 1, the cooling having been carried out at a temperature of −7° C. (crystallization of sodium chloride dihydrate) and the stock having been warmed up to a temperature of +7° C. (crystallization of anhydrous sodium chloride).

The salt, collected after the final treatment over the 100 μm screen and removal of the fine particle-size fraction, was analyzed in terms of its calcium, magnesium and $SO_4$ ion contents:

| | |
|---|---|
| calcium | 0.75 g/kg |
| magnesium | 0.0 g/kg |
| sulphate | 1.6 g/kg |

EXAMPLE 3

In this example, the crystallization of anhydrous sodium chloride and the subsequent particle-size classification were carried out in a fluidized bed as described above with reference to FIG. 4. The other test conditions were identical to those in Example 2. The purified salt was analyzed in terms of its calcium and $SO_4$ ion contents:

| | |
|---|---|
| calcium | 0.21 g/kg |
| sulphate | 0.9 g/kg |

What is claimed is:

1. Process for enriching crude salt, in which
   the crude salt is ground,
   the ground crude salt is cooled in a saturated aqueous sodium chloride solution to a temperature, below the anhydrous sodium chloride to sodium chloride dihydrate transition temperature,
   a stock of a powder comprising sodium chloride crystals is collected from the solution,
   the powder is subjected to particle size fractionation from which a fine particle-size fraction and a coarse particle-size fraction comprising the enriched salt are collected, and
   the sodium chloride crystals in the powder have a higher mean diameter than the mean diameter of the ground crude-salt particles.

2. Process according to claim 1, comprising heating the stock to a temperature above the aforementioned transition temperature before the powder is subjected to particle-size fractionation.

3. Process according to claim 1, in which the saturated aqueous sodium chloride solution comprises a mother liquor separated from the stock.

4. Process according to claim 1, in which the particle-size fractionation of the powder comprises a screening step or an elutriation step.

5. Process according to claim 1, in which the particle-size fractionation comprises an elutriation step which is carried out in a fluidized bed of sodium chloride crystals at a temperature above the aforementioned transition temperature.

6. Process according to claim 1, which comprises setting the particle-size fractionation so that the fine particle-size fraction and the coarse particle-size fraction have a cut-off diameter approximately equal to the mean diameter of the crude-salt particles after grinding.

7. Process according to claim 1, comprising subjecting the ground crude salt to particle-size separation, collecting from said particle-size separation a fine particle-size fraction and a coarse particle-size fraction cooling said fine particle-size fraction in the aqueous sodium chloride solution and removing said coarse particle-size fraction.

8. Process according to claim 7, in which the particle-size fractionation of the powder and the particle size separation of the ground crude salt have each a cut-off diameter such that the cut-off diameter for particle size fractionation is no more than 20 percent less than the cut-off diameter for particle-size separation.

9. Process according to claim 8, in which the cut-off diameter for particle-size separation of the ground crude salt is at most equal to 100 μm, the cut-off diameter for particle-size fractionation of the powder being at least equal to 100 μm.

* * * * *